Figure 1:
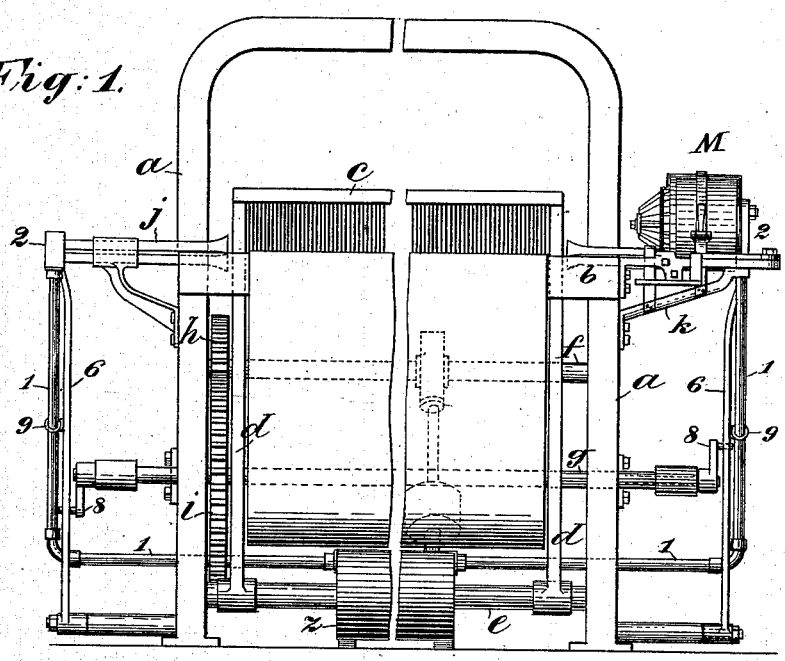

No. 714,274.  
Patented Nov. 25, 1902.

W. H. BAKER & F. E. KIP.
WEFT REPLENISHING MECHANISM FOR LOOMS.
(Application filed Dec. 11, 1899.)

(No Model.)  
5 Sheets—Sheet 1.

WITNESSES:  
INVENTORS  
William H. Baker  
Frederic E. Kip  
BY  
Henry Connett  
ATTORNEY

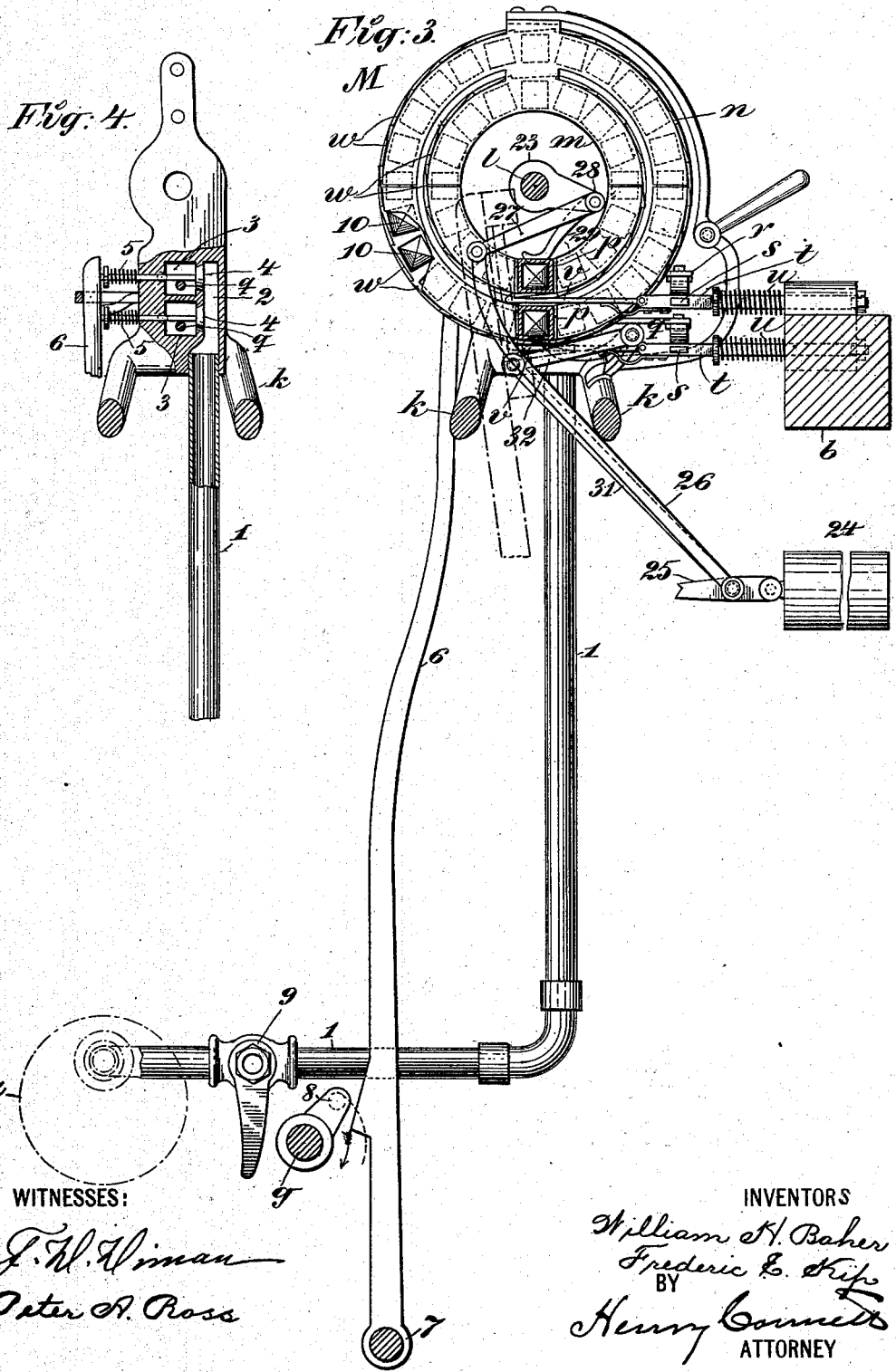

No. 714,274. Patented Nov. 25, 1902.
W. H. BAKER & F. E. KIP.
WEFT REPLENISHING MECHANISM FOR LOOMS.
(Application filed Dec. 11, 1899.)
(No Model.) 5 Sheets—Sheet 3.
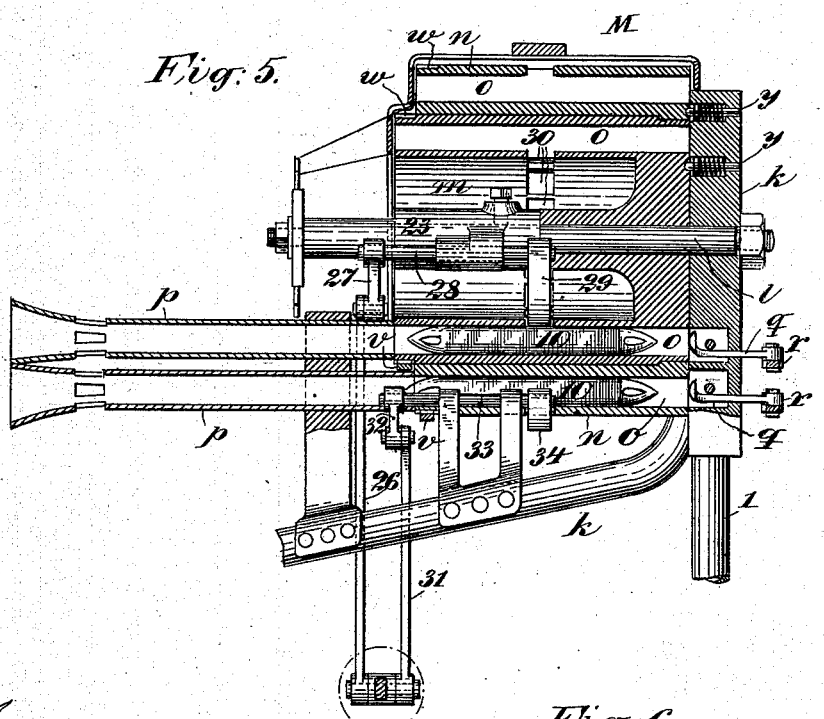
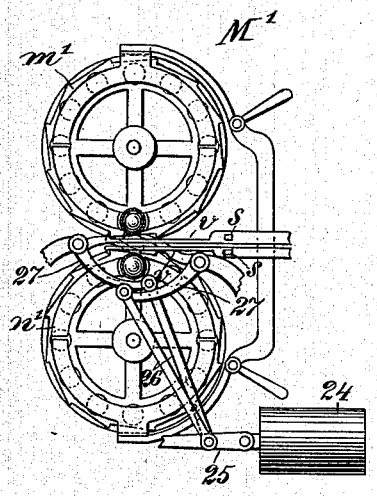
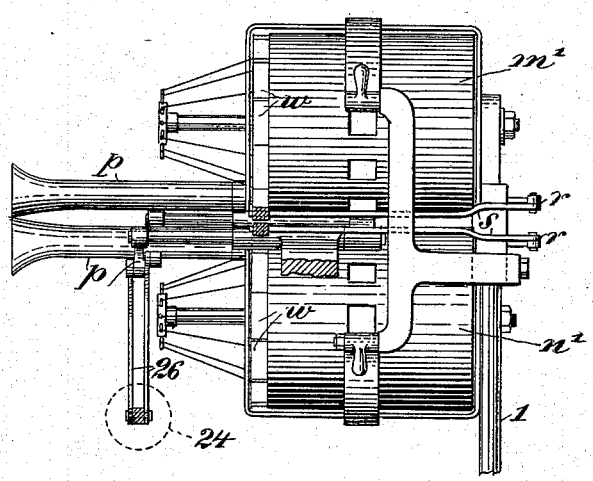
WITNESSES:
INVENTORS
William H. Baker.
Frederic E. Kip
BY
Henry Connett
ATTORNEY No. 714,274. Patented Nov. 25, 1902.
W. H. BAKER & F. E. KIP.
WEFT REPLENISHING MECHANISM FOR LOOMS.
(Application filed Dec. 11, 1899.)
(No Model.) 5 Sheets—Sheet 4.
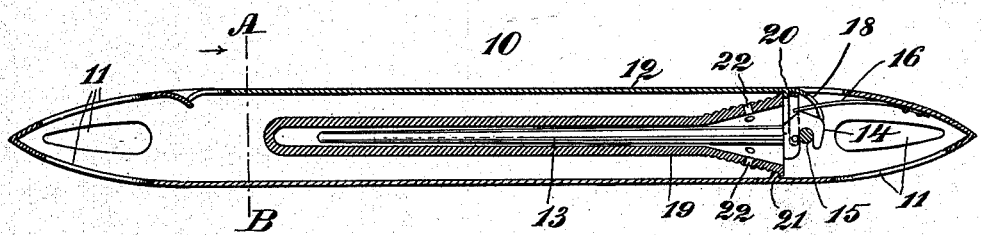
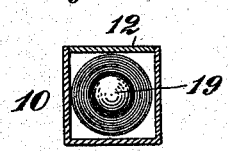 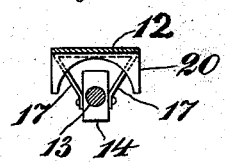
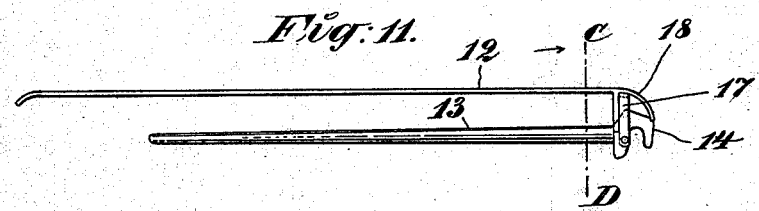
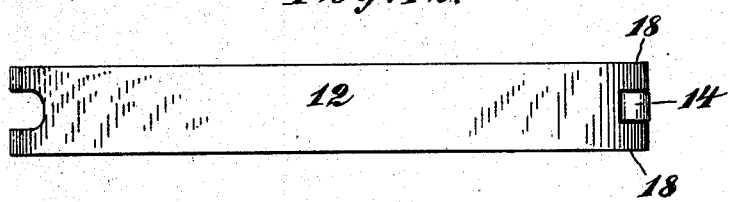

No. 714,274. Patented Nov. 25, 1902.
W. H. BAKER & F. E. KIP.
WEFT REPLENISHING MECHANISM FOR LOOMS.
(Application filed Dec. 11, 1899.)

(No Model.)  5 Sheets—Sheet 5.

WITNESSES:
J. H. Hinman
Peter A. Ross

INVENTORS
William H. Baker
Frederic E. Kip
BY
Henry Connett
ATTORNEY

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

WEFT-REPLENISHING MECHANISM FOR LOOMS.

SPECIFICATION forming part of Letters Patent No. 714,274, dated November 25, 1902.

Application filed December 11, 1899. Serial No. 739,874. (No model.)

*To all whom it may concern:*

Be it known that we, WILLIAM H. BAKER, residing at Central Falls, Providence county, Rhode Island, and FREDERIC E. KIP, residing at Montclair, Essex county, New Jersey, citizens of the United States, have jointly invented certain new and useful Improvements in Weft-Replenishing Mechanism for Looms, of which the following is a specification.

This invention relates to the class of looms wherein two shuttles are in play at all times. As an example, it is a common practice in weaving pile fabrics, such as plushes and velvets, to weave two backs and float the pile-warps in between them, and two shuttles or weft-carriers traverse the sheds, usually one above the other and simultaneously, and a single reed beats up the two shots.

The present invention has for its object to provide a double-shuttle loom with magazines for supplying full weft-carriers or shuttles as needed in place of those exhausted.

In our Letters Patent No. 659,950, dated October 16, 1900, we have shown a weft or filling changing or supplying mechanism wherein a rotary magazine shuttle-box is employed, the same consisting of a drum with a series of concentrically-arranged shuttle cells or boxes which are primarily filled with full weft-carriers or shuttles which fit snugly or somewhat like pistons in their respective cells. Pneumatic mechanical means are provided whereby when the shuttle in play enters its cell if it is nearly exhausted it sets in motion mechanism which causes intermittent rotation of the magazine and brings into the picking position another cell containing a fresh or full weft-carrier. The picking is effected by means of a compressed aeriform fluid, as compressed air. In said patent also the magazine is shown both as vibrating with the lay and as stationary or non-vibrating, and it is shown at one side of the loom as well as at both sides thereof. The present construction is also adapted for using a compressed aeriform fluid for picking the shuttle. It employs rotary magazines with concentric shuttle-cells, one magazine for each of the shuttles in play, usually an upper and a lower shuttle. It employs a pneumatic mechanical device whereby the shuttle when nearly exhausted effects the partial rotation of the magazine, and there may be magazines at each side of the loom or at but one side thereof; also, the magazines may vibrate with the lay or be non-vibrating.

The peculiar features of the present construction which differ from those illustrated in our said patent will be hereinafter pointed out and their novel characteristics carefully defined in the claims.

Figure 2:
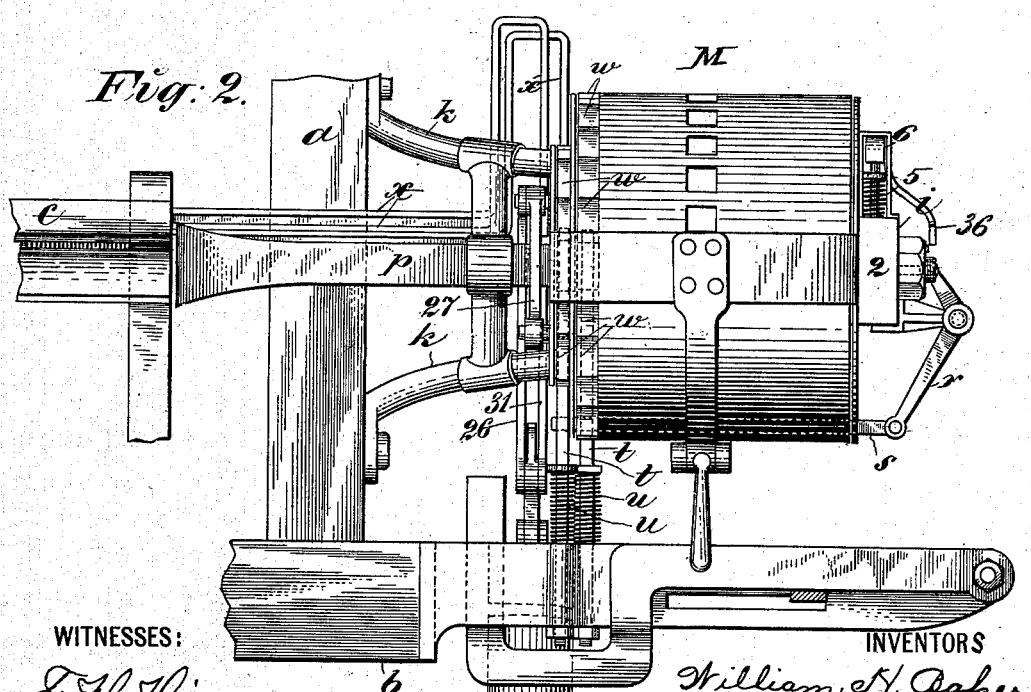
Figure 13:
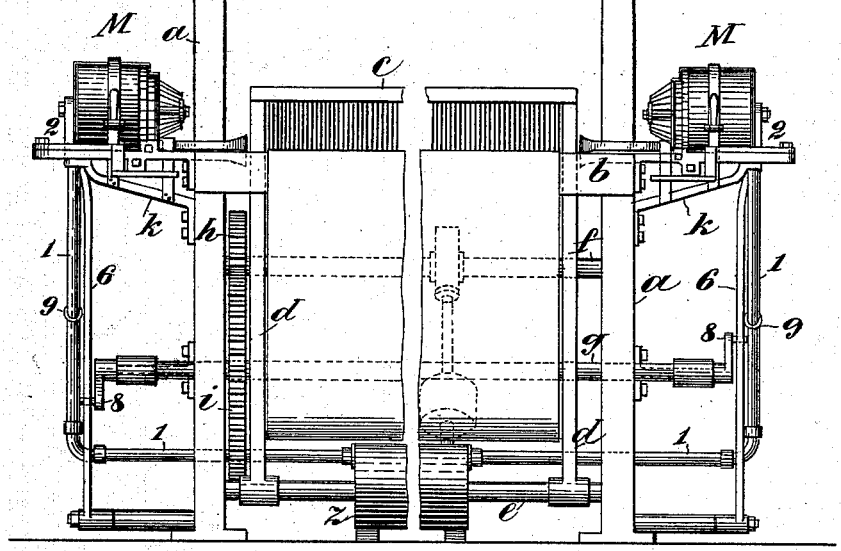
Figure 14:
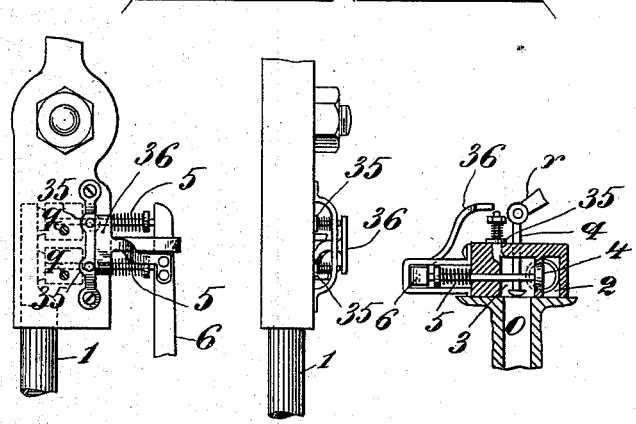

In the accompanying drawings, which illustrate the invention, Figure 1 is a front view of a loom, showing one form of the invention applied thereto. This view is on a small scale and shows only so much of the loom as is necessary to illustrate the invention. Figs. 2, 3, 4, and 5 are views on a larger scale than Fig. 1. Fig. 2 is a plan of the magazines and the adjacent parts. Fig. 3 is an end or face view of the magazines. Fig. 4 is a detail view of the valve mechanism for admitting compressed air to pick the shuttles, and Fig. 5 is a vertical longitudinal section of the magazine. Fig. 6 is a side elevation illustrating a construction where the two magazines are situated one above the other instead of one within the other, and Fig. 7 is a front elevation or end view of the same. Figs. 8, 9, 10, 11, and 12 are views illustrating the construction of the shuttle or weft-carrier. Fig. 13 is a view similar to Fig. 1, illustrating an embodiment of the invention wherein there is a compound magazine at each side of the loom. Fig. 14 includes a rear, edge, and plan view of the valve mechanism seen in Fig. 4, illustrating the pressure-regulating device for the cells, to be hereinafter described.

In the drawings and particularly in Fig. 1, *a* represents the loom-frame; *b*, the breast-beam; *c*, the reed; *d*, the lay-swords which carry the reed; *e*, the swing-rail; *f*, the crank-shaft from which the reed receives its vibrations; *g*, the cam-shaft, and *h i* the gears by which the cam-shaft is driven from the crank-shaft. At the left in Fig. 1 is seen the double-shuttle box *j* and at the right is seen the double magazine, (indicated as a whole by M.) As shown herein, the magazines M and shuttle-box $j$ are non-vibrating—that is, they are not carried by the batten, reed, or other vibrating part of the loom.

Referring particularly to the detail views, Figs. 2 to 5, the magazines and their appurtenances will now be described. A bracket $k$ on the loom-frame supports a spindle $l$, Fig. 5, and on this spindle is rotatively mounted a magazine $m$. This magazine is situated within an outer magazine $n$, which rotates on the inner magazine. Each magazine has in it a series of concentrically-arranged shuttle-cells $o$. As seen in Figs. 3 and 5, the two lower cells of the magazines will be situated one above the other, and these will form the working cells for the time being, the working cell of the inner magazine $m$ being the upper cell and that of the outer magazine $n$ the lower cell. As shown in these views, the cells are rectangular in cross-section; but the present invention is not limited in this respect. The two working cells of the magazines will be alined, respectively, with two tubular guides or directors $p$, similar to those shown in our Patent No. 659,950. Each magazine $m$ and $n$ is operated independently—that is, it receives intermittent rotary impulses at proper times to bring the next adjacent cell into working position to supply a fresh shuttle. The mechanism for effecting this will now be described.

The mechanisms for operating the two magazines are substantially the same or may be the same, and it will only be necessary to describe one, premising that the same characters of reference designate like parts in both. It will suffice to say here that the shuttle enters the working cell somewhat in the manner of a piston and is resisted normally by a cushion of air therein, so that it cannot enter into the full extent; but when the weft or filling therein is nearly exhausted such exhaustion opens a passage for air through the shuttle, whereby the tension of the air-cushion is reduced, and then the shuttle enters the cell to the full extent. In so entering the shuttle impinges upon the head of a push-rod $q$, Fig. 5, which plays through a casing at the back of the working cell and is coupled to one arm of an elbow-lever $r$. The other arm of this lever, Fig. 2, is coupled to a detent-rod $s$, the free end of which plays through a pawl-slide $t$, mounted in a guide on the breast-beam and provided with a retracting-spring $u$. The slide $t$ is provided with a spring hook-pawl $v$, which engages one of a series of ratchet-teeth $w$ on the magazine. Now when the nearly-exhausted shuttle enters the working cell and impinges on the push-rod $q$ the latter acts through the elbow-lever to push forward the detent-rod $s$ into the path of a suitable tappet $x$ on the lay or going part of the loom, whereby when the reed beats up this tappet strikes the rod $s$ and operates the pawl $v$ to rotate the magazine to an extent sufficient to bring the next adjacent shuttle-cell thereof into working position. This magazine-operating mechanism is similar to that shown in our aforesaid patent, No. 659,950. To arrest the magazine and aline the cell properly, the same means may be employed as that described in our said Patent No. 659,950—that is to say, a spring-stud $y$, Fig. 5, adapted to snap into and engage one of a series of recesses in the end of the magazine.

The means for picking the shuttles or weft-carriers will now be described with especial reference to Figs. 1, 3, and 4, premising, however, that the invention is not restricted in this respect. A reservoir $z$, containing a compressed aeriform fluid, as air, is connected by a pipe 1 with a valve-chamber 2, Fig. 4, at the back of the magazines. This chamber communicates with two air-receiving chambers 3 3, open to the respective working cells of the magazines by ports closed by valves 4 4, held closed by springs 5 5. A valve-operating arm 6, hinged below at 7, bears on the stems of these valves and is actuated to open the latter simultaneously by a cam 8 on the cam-shaft $g$. In the air-pipe 1 is a self-closing cock or valve 9, which is also adapted, Fig. 3, to be opened by the cam 8. The pipe 1, between the valves 4 and the self-closing cock or valve 9, forms a reservoir or vessel to contain a proper charge of compressed air sufficient to drive or pick the shuttles and insures a uniform charge or volume of air being used at each pick. The operation is as follows: As the cam 8 rotates it first opens the cock 9 and admits a charge of compressed air to the pipe between the valve 9 and valves 4. The valve 9 then closes, and as the cam continues to rotate it next impinges on the arm 6 and causes it to open the valves 4, thus admitting the charge of compressed air to the shuttles to pick or drive them through the sheds. On the opposite side of the loom, Fig. 1, the same device is employed for admitting a picking charge of air to the shuttle-boxes $j$, and the same reference characters are employed for the like parts. In this case, however, the cam is reversed in position, so that the picks from opposite sides may alternate.

The preferred construction of the shuttle 10 will now be described with especial reference to Figs. 8 to 12. Fig. 8 is a longitudinal section of the shuttle, showing an empty bobbin therein; and Fig. 9 is a cross-section thereof at A B in Fig. 1. Fig. 10 is a cross-section of the cover and spindle at C D in Fig. 11. Fig. 11 is a side view of the cover and spindle detached, and Fig. 12 is a plan of the same. The shuttle-body will be made of some thin sheet material, preferably sheet metal, and it will have an air aperture or apertures 11 in its tapered ends. The top of the shuttle has in it an opening which will be closed by a cover 12. The spindle 13 has an angular head 14 by which it is hinged to a cross-rod 15, fixed in the shuttle-body, and a spring 16 on the shuttle bears on said head at the hinging point, and thus keeps the spindle in place. The cover 12 has lugs 17, by which it is secured to the head of the spindle, and has curved lips 18, which embrace the said head. The bobbin 19 is adapted to slip onto the spindle in the usual way after the spindle shall have been turned out on its hinge in a known way. The head or flared end of the bobbin abuts against a shoulder 20 on the cover 12, and a flange on the bobbin takes behind a slight ledge 21 on the bottom of the shuttle-body. Obviously the bobbin when full acts as a partition to cut off communication between the air-apertures 11 at the opposite ends of the shuttle-body; but the bobbin has in it an aperture or apertures 22, which when uncovered by the partial exhaustion of the weft or filling open a way for the passage of air through the shuttle. Now while the apertures 22 are closed by the weft the shuttle when it enters the working cell of the magazine will be opposed by a cushion of air therein; but when nearly denuded of weft and said apertures are opened thereby the said cushion will be relieved by the free flow of air back through the shuttle, and this will allow the shuttle to advance far enough to actuate the controlling mechanism and cause the magazine to be shifted. Up to the present time it has been found impossible with the various weft or filling supplying mechanisms to operate the same in a double-shuttle loom either by supplying the bobbins to the shuttles or the full shuttles to the loom without leaving a defect in the fabric due to the absence of one or more weft-shots, and our present invention is the first to furnish a double-shuttle loom with a weft or filling supplying mechanism wherein the weft is replenished before it is wholly exhausted.

Figs. 6 and 7 illustrate a modified form of the device, wherein the two magazines are situated one above the other instead of one within the other. In this construction $m'$ is the upper magazine and $n'$ the lower magazine. They rotate on centers independently, the working cell being at the top of the lower magazine and at the bottom of the upper magazine. The means for rotating them is in substance the same as that described with reference to the principal views.

Referring to the principal views, and particularly Fig. 5, it may be explained that the inner magazine $m$ is longer than the outer one $n$, so as to provide access to the ratchet-teeth $w$ thereon, that the outer magazine is slipped over the inner from the outer end of the latter (at the right in Fig. 5) and up to a shoulder on the latter and is held in place by the bracket $k$, that the spindle or axis $l$ is passed through from the left in Fig. 5 and secured by a nut in the bracket $k$, and that the central boss of the inner magazine is cut away to make room for a sleeve 23, which is set on the spindle $l$. This latter feature of the construction is to provide for the employment of a protecting-finger. It is very common to provide a loom with means whereby in case a shuttle when picked does not enter or properly enter its box or cell the loom-stopping mechanism will be set in motion and the loom stopped. On the loom-frame is mounted an air-cushion device 24, Fig. 3, the piston-rod thereof carrying a dagger 25. This dagger is coupled by a link 26 with an arm 27 on a rock-shaft 28, which rocks in a bearing in a lug on the sleeve 23. On the rock-shaft 28 is a protection-finger 29, which enters in the usual way an aperture 30 in the cell $o$. The outer magazine is provided with a similar device. (Seen in Fig. 5.) In this construction the dagger 25 is coupled by a link 31 with an arm 32 on a rock-shaft 33, carrying a protection-finger 34. The function of a protection-finger in a loom is too well known to require a minute description.

We are the first inventors, as we believe, of a double-shuttle loom having an automatic weft or filling changing or supplying mechanism under pneumatic control or wherein the point at which the shuttle comes to rest in the shuttle-box is governed by the degree of exhaustion of the weft or filling in the shuttle and wherein the incoming exhausted or substantially exhausted shuttle sets in operation the weft or filling supplying mechanism. Therefore we claim such a loom in its broadest sense and without restriction to any specific devices for accomplishing the result, and we would consider our invention practiced in a double-shuttle loom having an automatic weft or filling changing or supplying mechanism adapted to be set in operation by the shuttle, which latter enters the box to a certain extent when it is charged with weft or filling and to a different extent when it is exhausted or substantially exhausted—that is to say, wherein said supplying mechanism is set in operation through the medium of the shuttle, which latter comes to two resting-positions in the box—one when it is properly charged with weft or filling and the other only when the said weft or filling is wholly or substantially exhausted.

Fig. 13 illustrates a loom provided with a compound magazine at each side. The same mechanical devices are employed with both.

It may be desirable to regulate the tension of the air-cushion incarcerated in a cellular magazine of the general character herein described, so that when a full or working shuttle enters the working cell only the proper degree of tension of the air in the latter will be reached to allow the shuttle to enter the cell as far as desired. To this end means are provided for keeping the tension down in the cell as low as may be found necessary, and such means, or one form of device for the purpose, is illustrated in Fig. 14. In the back or outer wall of the casing containing the two air-receiving chambers 3 3 are mounted two like relief-valves 35, one for each chamber and opening outward, each valve being held closed by a suitable spring of the desired strength. When the shuttle enters the cell, the air compressed in front of it, if the tension becomes too great, will lift the valve 35 and escape until the tension is properly reduced. In order that these relief-valves may be held against opening when the valves 4 4 are opened to admit air for picking the shuttle, the operating-arm 6 is provided with a bar or piece 36, which moves over the ends of the stems of the valves 35 at the instant the valves 4 are opened and prevents the relief-valves from rising.

By the term "shuttle" as herein employed we mean any weft-carrier which is capable of carrying the weft or filling or yarn through the warp-shed of a loom in the process of weaving, and by the term "bobbin" as herein employed we mean any weft or filling or yarn-holder in or to go into a shuttle on which said weft, filling, or yarn is wound.

By the phrase "presence or absence or substantial absence and exhaustion or substantial exhaustion of the weft or filling in the shuttle" we mean either the entire denudation of the bobbin or such degree of denudation thereof as will allow the shuttle to perform its functions in setting in operation the supplying mechanism.

We have shown herein means for picking or driving the shuttle with compressed air; but some of the features of the invention are applicable as well to other means for picking the shuttle—as, for example, with a pickerstick and picker, as shown in our Patent No. 659,952, dated October 16, 1900.

Where an aeriform fluid under tension is employed to pick or drive the shuttle, the charge of fluid will be to some extent deflected laterally through apertures in the walls of the shuttle-director near its receiving end, so that the entire force of the expansion of the charge shall not be expended in the direction in which the shuttle travels; but we do not limit ourselves to this particular deflecting means. In our Patent No. 674,157, dated May 14, 1901, another means for deflecting the fluid is illustrated.

We have shown and described in this application pneumatic control; but we do not limit ourselves in this respect. Other controlling means are known and may be employed. Also other means for rotating the magazine or shuttle-feeder than that shown are known, and we do not limit ourselves in this respect. For example, another device for this purpose is illustrated in our said Patent No. 659,952.

Having thus described our invention, we claim—

1. A double-shuttle loom having automatically-operated means for supplying fresh, filled shuttles as needed, said means comprising two rotary magazines one within the other, and means controlled by the presence or absence of weft on the shuttles in play, for operating said magazines.

2. A shuttle or weft-carrier, having a spindle hinged in it, and a cover for the opening in the shuttle carried by said spindle.

3. A shuttle or weft-carrier having a spindle hinged in it, and a cover for the opening in the shuttle hinged to said spindle.

4. A shuttle or weft-carrier having apertures in its tapered ends, a large opening in its top, and a hinged cover adapted to close said opening.

5. A loom having at each side an automatically-operating weft or filling changing or supplying mechanism, and pneumatic mechanical means controlling said supplying mechanism, the same being made inoperative and operative, respectively, by the presence or absence of weft or filling in the weft-carrier.

6. The combination with a shuttle-cell, and a shuttle having a passage through it closed by the weft or filling in the shuttle, of a relief device for automatically regulating the tension of the air-cushion in front of the incoming shuttle.

7. The combination with a shuttle-cell having a relief device for regulating the tension of the air-cushion incarcerated in the cell in front of the incoming shuttle, the shuttle having an air-passage in it controlled by the weft or filling in the shuttle, and means for admitting an aeriform fluid under tension to the said cell to pick or drive the shuttle.

8. The combination with a valve for admitting compressed air to pick the shuttle, an arm for operating said valve, a relief-valve 35, and a part 36, carried by said arm to prevent the valve 35 from opening when the air is admitted to pick the shuttle.

9. In a loom wherein the shuttle is picked by a compressed aeriform fluid, the combination with the shuttle-box, a source of compressed aeriform fluid, and a valve for admitting the fluid to the shuttle-box, of a reservoir to contain a proper charge of the fluid for picking or driving the shuttle, a cock or valve for admitting the fluid to said reservoir, and mechanism for operating the said controlling cocks or valves alternately, whereby a measured picking charge of fluid is furnished.

10. In a loom wherein the shuttle is picked by a compressed aeriform fluid, the combination with a source of said fluid, a shuttle-box, and a conduit which supplies the fluid to said box, of a valve controlling the admission of fluid to the shuttle-box and situated near the same, a self-closing cock or valve 9, for controlling the admission of the fluid to the conduit which forms a charge-reservoir between the cocks or valves, a rotating shaft, and a cam thereon adapted to open said cocks or valves alternately, substantially as set forth.

11. In a double-shuttle loom, the combination with two rotatively-mounted, celled magazines, one rotating within the other, and mechanisms for imparting rotative impulses to said magazines, of mechanism controlled by the weft or filling in the shuttles in play for setting in operation the respective magazine-rotating mechanisms, the said shuttles, and protecting mechanisms, substantially as described, to stop the loom in case the respective shuttles do not get home in their cells.

12. The combination with the two rotary, multiple-celled magazines, one within the other, and each having a fixed shuttle-director, of movable means for closing the upper cells of said magazines, substantially as set forth.

13. In a double-shuttle loom, the combination with two rotary, multiple-celled shuttle-magazines, one situated within the other and both turning about a common center, and a weft end holder common to both magazines, of means for imparting rotary impulses to said magazines, and pneumatic mechanical means controlled by the weft or filling in the shuttles in play for setting in motion the respective rotating means of the magazines.

In witness whereof we have hereunto signed our names, this 15th day of November, 1899, in the presence of two subscribing witnesses.

WILLIAM H. BAKER.
FREDERIC E. KIP.

Witnesses:
HENRY CONNETT,
PETER A. ROSS.